(12) United States Patent
Duff

(10) Patent No.: US 6,439,081 B1
(45) Date of Patent: Aug. 27, 2002

(54) HARMONIC FRICTION DRIVE

(75) Inventor: David G. Duff, Woodside, CA (US)

(73) Assignee: Xerox Corporation, Stamford, CT (US)

(*) Notice: Subject to any disclaimer, the term of this patent is extended or adjusted under 35 U.S.C. 154(b) by 38 days.

(21) Appl. No.: 09/723,689

(22) Filed: Nov. 28, 2000

(51) Int. Cl.$^7$ .............................................. F16H 37/00
(52) U.S. Cl. ........................................................ 74/640
(58) Field of Search ........................ 74/640, 527, 531, 74/530

(56) References Cited

U.S. PATENT DOCUMENTS

| | | | | |
|---|---|---|---|---|
| 3,139,770 A | * | 7/1964 | Musser .......................... 74/798 |
| 3,304,809 A | * | 2/1967 | Hellen ........................... 74/798 |
| 3,877,259 A | * | 4/1975 | Bishop ............................ 64/29 |
| 4,237,751 A | * | 12/1980 | Davis ............................ 74/801 |
| 4,557,153 A | * | 12/1985 | Ulbing ............................. 74/2 |
| 4,625,582 A | * | 12/1986 | Kiryu ............................ 74/640 |
| 5,269,202 A | | 12/1993 | Kiyosawa et al. .............. 74/640 |
| 5,337,638 A | * | 8/1994 | Coss et al. ..................... 81/483 |
| 5,775,178 A | | 7/1998 | Asawa et al. .................. 74/640 |
| 5,850,765 A | | 12/1998 | Shirasawa ...................... 74/640 |
| 5,906,142 A | | 5/1999 | Shirasawa ...................... 74/640 |
| 6,065,362 A | | 5/2000 | Kiyosawa et al. .............. 74/460 |
| 6,082,222 A | | 7/2000 | Kiyosawa et al. .............. 74/640 |
| 6,119,553 A | | 9/2000 | Yamagishi et al. ............. 74/640 |

OTHER PUBLICATIONS

Harmonic Drive Gearing, HDUC Mini Series Component Set and Unit, 13 Pages.

* cited by examiner

*Primary Examiner*—Rodney H. Bonck
*Assistant Examiner*—Eric M. Williams
(74) *Attorney, Agent, or Firm*—Perman & Green, LLP

(57) ABSTRACT

A harmonic friction drive comprises a rigid ring having a cylindrical inside surface of a given circumference, the inside surface being free of gear teeth. A member having a flexible tube portion is nested in the rigid ring. The flexible tube portion has an outer surface whose circumference is smaller than the given circumference. The outer surface is also free of gear teeth. A wave generator pushes the outer surface of the flexible tube portion into frictional engagement against the inside surface of the ring, at two or more zones of contact along the inside surface and rotates the two or more zones of contact about the inside surface of the ring. The difference in circumference between the outside surface of the flexible tube portion and the inside surface of the ring causes the flexible tube portion to rotate a small amount relative to the ring upon each complete revolution of the wave generator.

6 Claims, 5 Drawing Sheets

US 6,439,081 B1

HARMONIC FRICTION DRIVE

BACKGROUND OF THE INVENTION

1. Field of the Invention

This invention relates to a harmonic friction drive apparatus.

2. Prior Art

Harmonic gear drive transmissions are typically used in industrial robots, machine tools, printing presses, medical equipment, communications equipment, solar energy applications, and high precision electronic component production. They can provide high ratios of gear reduction in a single stage compact arrangement.

There are three basic components used in a harmonic drive. A circular rigid ring, a flexible ring which is a non-rigid thin cylindrical cup of slightly smaller diameter than the rigid ring and a wave generator which is fitted within the cylindrical cup to elastically deflect it against the circular ring. The flexible ring is slightly smaller in diameter than the rigid ring. In a typical approach the rigid ring includes internal gear teeth which engage external gear teeth on the smaller diameter flexible ring. The flexible ring has fewer teeth on its outer circumferential surface than the rigid ring has on its inner circumferential surface. The conventional wave generator typically has an elliptical shape so that the teeth of the rigid ring and flexible ring engage across the major elliptical axis of the harmonic gear drive. In this approach each turn of the wave generator moves the rigid ring a few teeth backwards on the flexible ring. As the wave generator rotates the zone of tooth engagement travels with the major elliptical axis.

A typical harmonic gear drive using a flexible cup type flexible ring is described in U.S. Pat. No. 5,269,206 to Kiyosawa et al. Further examples of harmonic gear drives can be found in U.S. Pat. Nos. 6,119,553 to Yamagaishi et al., 6,082,222 to Kiyosawa, 6,065,362 to Kiyosawa et al., 5,906,142 to Shirasawa, 5,850,765 to Shirasawa and 5,775,178 to Asawa et al. Each of these patents describes harmonic drives and various features of such drives. These patents are specifically incorporated by reference herein.

Further information concerning typical harmonic gear drives can be found in a catalog number 9705-2R-MINI put out by HD Systems, Inc., 89 Cabbot Court, Hauppauge, N.Y. 11788.

The harmonic gear drives described above employ a gear reduction approach wherein gear teeth are placed on both the external surface of the flexible ring and the internal surface of the rigid ring. Because of the use of gear teeth problems arise in miniaturizing such devices, since it is difficult to make the teeth of the gearing small enough to allow shrinking the size of the harmonic gear drive.

There is a need for an improved harmonic drive, which will provide high ratios of speed reduction or speed increase in a single stage. There is a need to significantly increase the upper limit of the reduction ratio or speed increase ratio which can be obtained, all at a reasonable cost. It is also desired to provide such a harmonic drive which due to its simplicity may be scalable to the MEMS (micro electromechanical systems) level.

SUMMARY OF THE INVENTION

In accordance with this invention there is provided an improved harmonic friction drive which can provide high ratio, speed reduction, speed increase, functions or function as a differential or provide various combinations of such functions. The device operates similarly to a conventional harmonic gear drive for carrying out those functions, except that it utilizes friction instead of gear teeth to transfer energy from a flexible member to a rigid outer ring, using a wave generator.

In accordance with a preferred embodiment of this invention a harmonic friction drive is provided comprising the following components. A rigid ring having a cylindrical inside surface of a given circumference, the inside surface being free of gear teeth. A member having a flexible tube portion, the flexible tube portion being nested in the rigid ring. The flexible tube portion has an outer surface whose circumference is smaller than the given circumference. The outer surface of the flexible tube portion is also free of gear teeth. A wave generator is arranged to push the outer surface of the flexible tube portion into frictional engagement against the inside surface of the rigid ring, at two or more zones along the inside surface. The wave generator rotates the two or more zones of engagement about the inside surface of the ring. The difference in circumference between the outside surface of the flexible tube portion and the inside surface of the ring causes the flexible tube portion to rotate a small amount relative to the rigid ring upon each complete revolution of the wave generator.

This invention is aimed at reducing cost by eliminating the gear teeth of a conventional harmonic gear drive thereby eliminating costly machining operations. It is also aimed at eliminating the barrier associated with the use of gearing with respect to making small scale versions of this drive.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

The harmonic friction drive of this invention can provide high ratios of speed reduction in a single stage, with very high upper limits to the reduction ratio, all at a reasonable cost, since no gear teeth have to be cut. In addition, due to the simplicity of the components, this drive may be scalable to the MEMS level Referring to FIGS. 1–5, a harmonic friction drive 10 in accordance with a preferred embodiment of this invention, comprises a high ratio, speed reduction device. The harmonic friction drive 10 operates similar to a conventional harmonic gear drive except that it utilizes friction instead of gear teeth to transfer energy from a flexible member 12 to a rigid outer ring member 14. Current high reduction ratio drives are provided either as multi stage gear drives or single stage harmonic gear drives. Multistage gear drives require a large number of parts and do not lend themselves to miniaturization. Harmonic gear drives are precision devices, which are expensive and limited by gear tooth size, with respect to the maximum reduction ratio which can be obtained and the extent to which they can be miniaturized.

Figure 1:
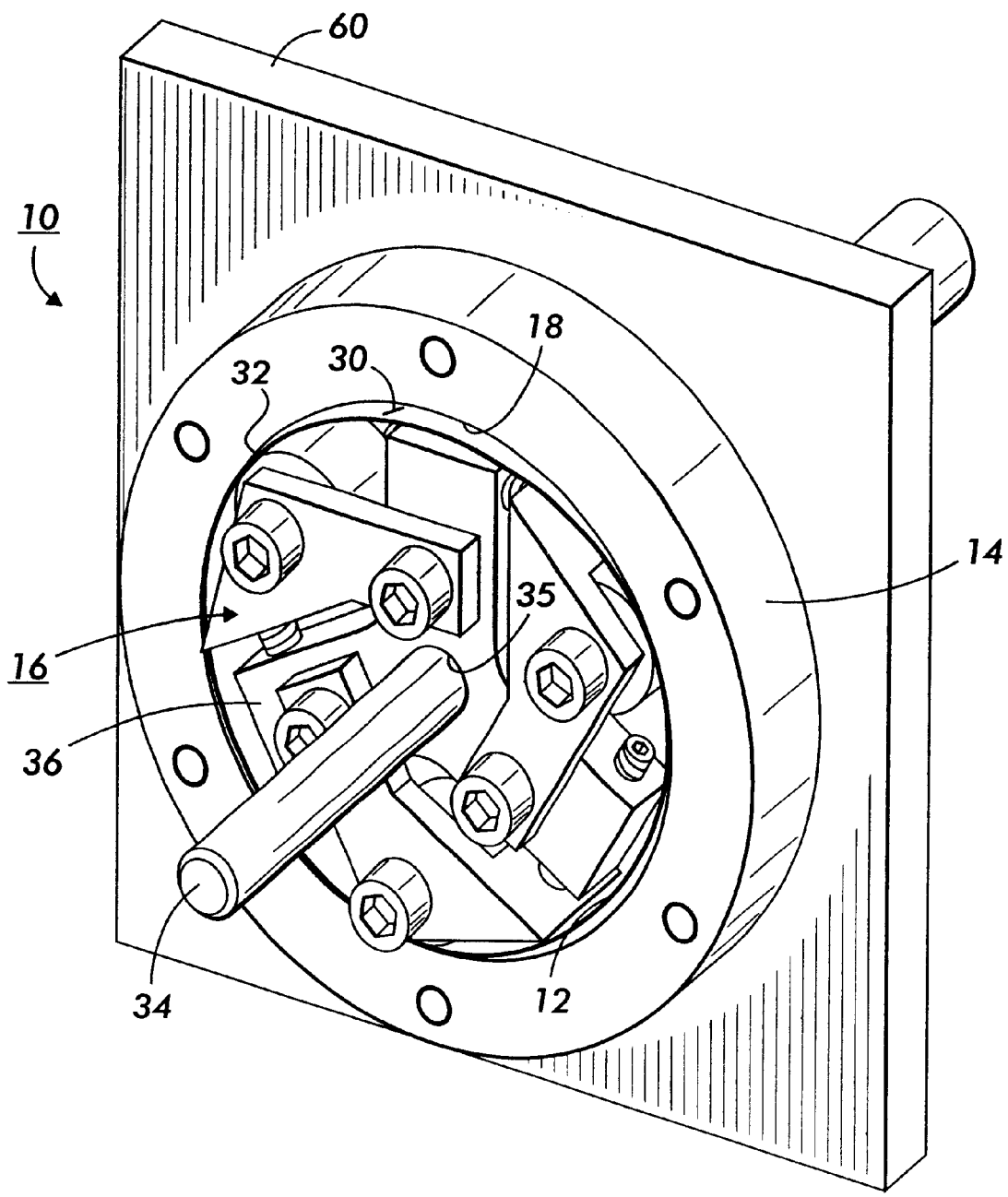
FIG. 1 is an exploded perspective view of a harmonic drive apparatus in accordance with a preferred embodiment of this invention including a three roll wave generator.
Figure 2:
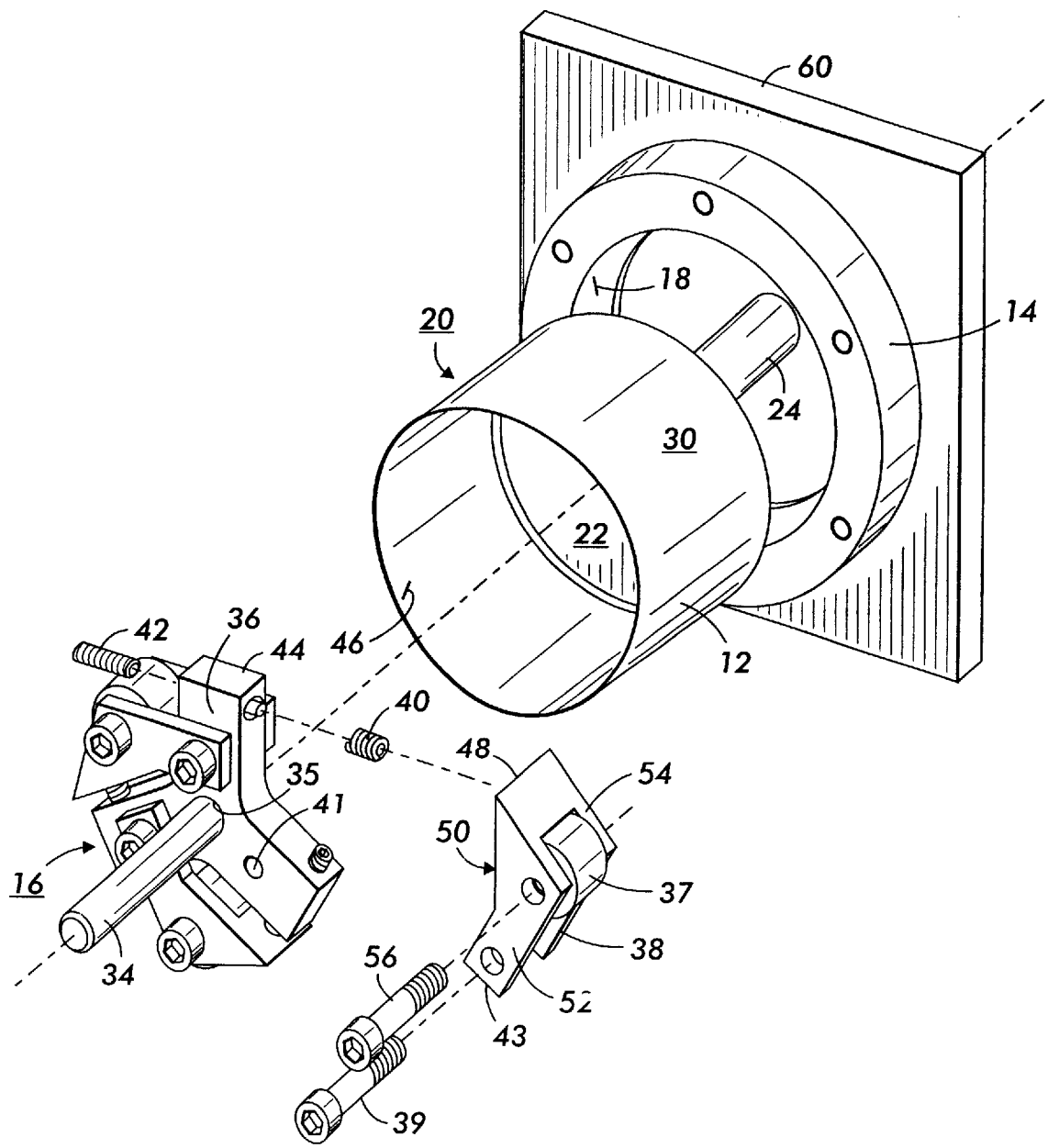
FIG. 2 is an exploded perspective view of the harmonic drive apparatus of FIG. 1.
Figure 3:
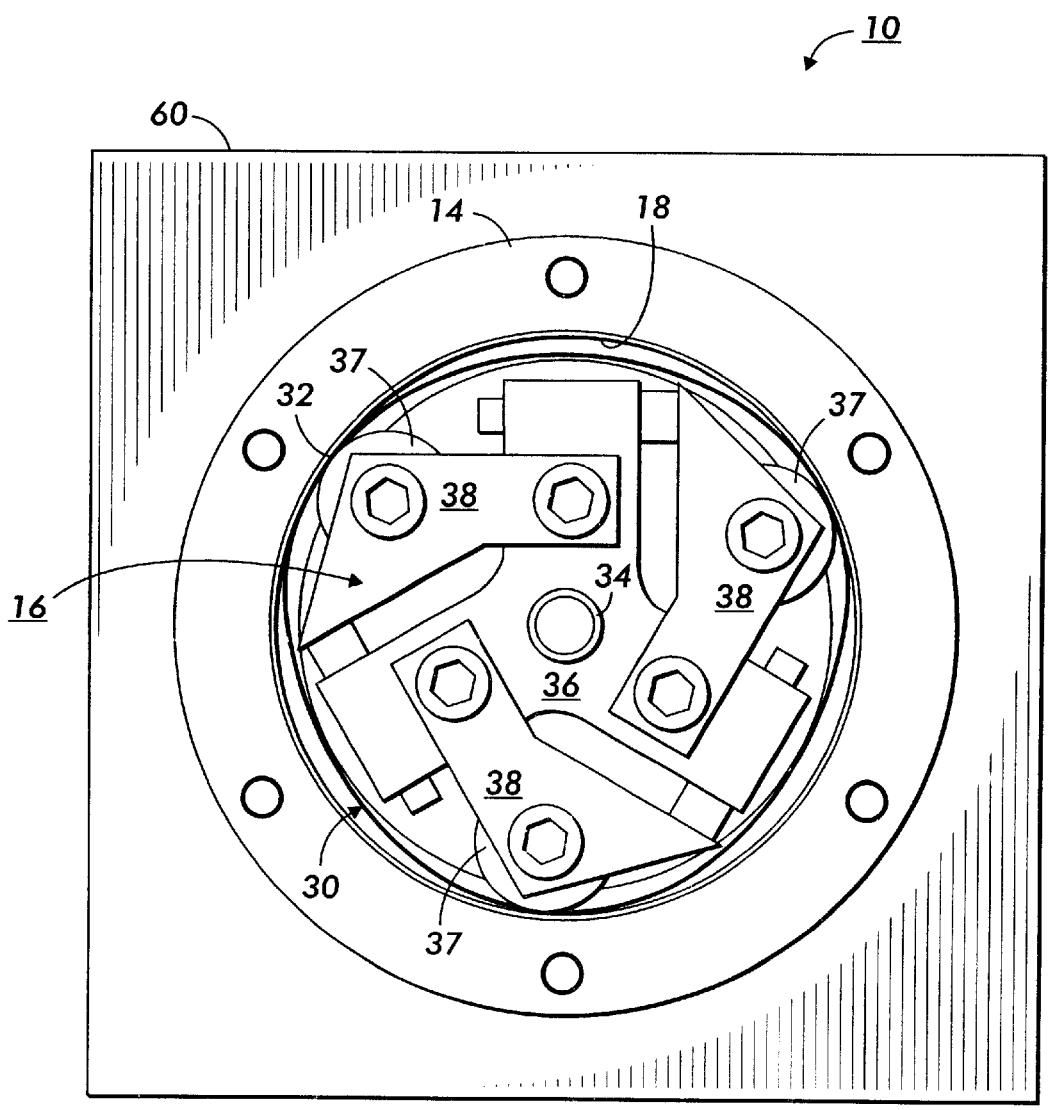
FIG. 3 is a front planar view of the harmonic drive apparatus of FIG. 1.
Figure 4:
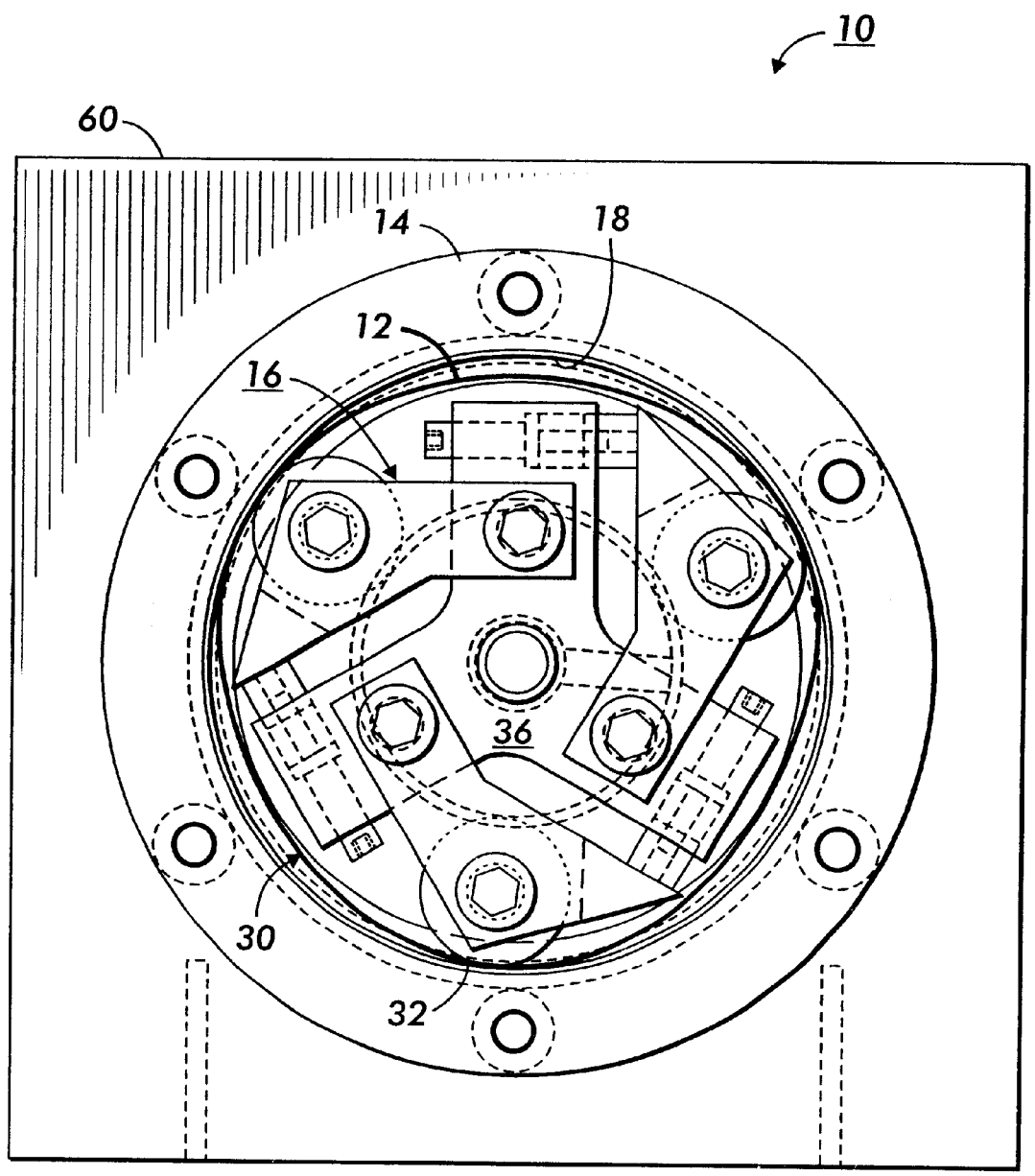
FIG. 4 is a detailed front planar view of the harmonic drive apparatus of FIG. 1.
Figure 5:
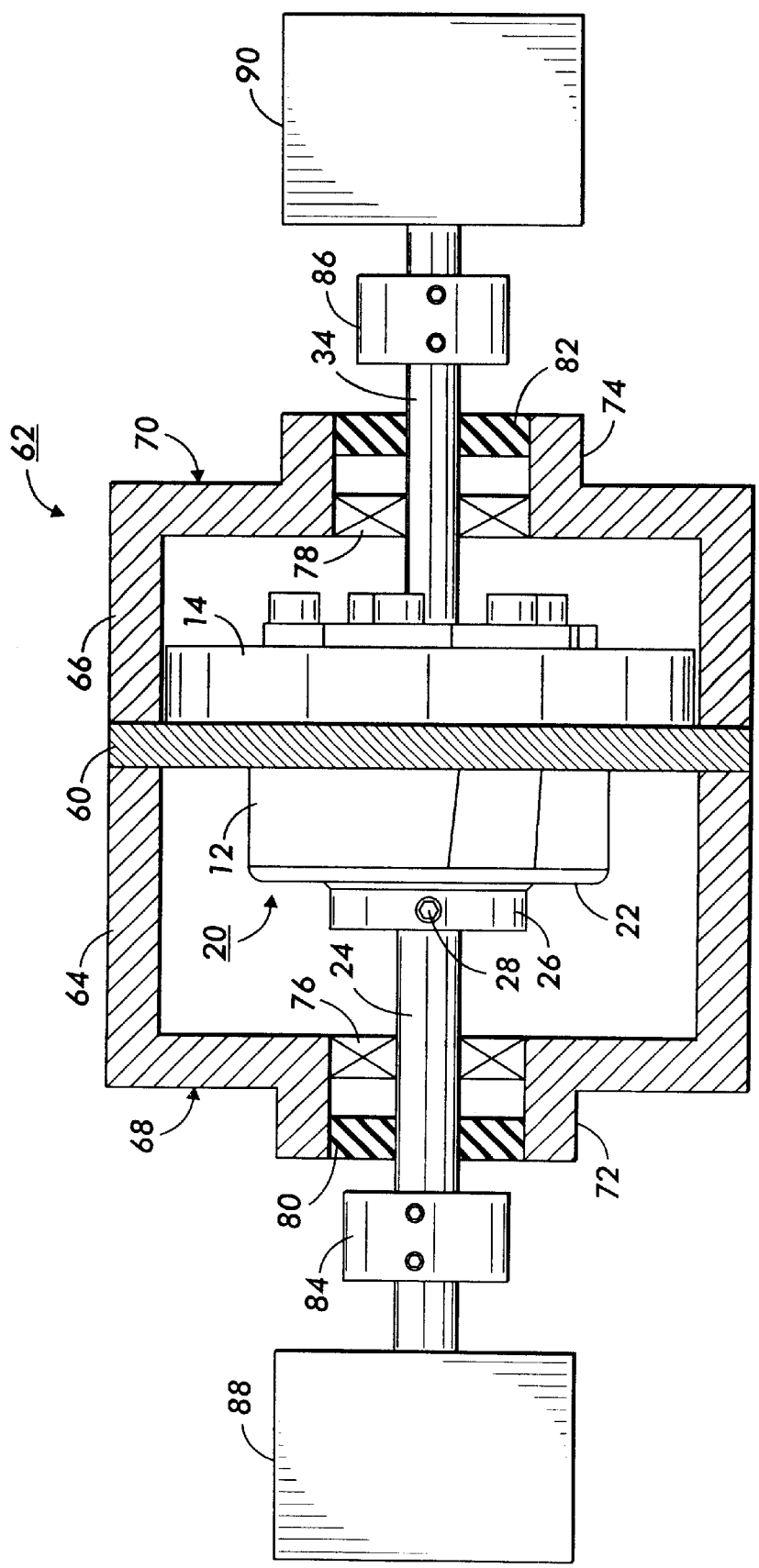
FIG. 5 is a side planar view of the harmonic drive apparatus of FIG. 1.

In accordance with this preferred embodiment of the invention a harmonic friction drive is provided comprising the following components. The rigid ring 14 has a cylindrical inside surface 18 having a given circumference and a given diameter. The inside surface 18 is free of gear teeth. As shown in FIGS. 2 and 5, a cup shaped member 20 includes a flexible tube portion, which comprises the flexible member 12, which is joined to a circular disk shaped web portion 22 which forms the bottom of the cup shaped member 20. The thickness of the web portion 22 preferably is greater than the thickness of the flexible tube portion 12 so that it can support an input or output shaft as the case may be. In this embodiment of the invention the shaft 24 is an output shaft connected by a coupling 26 and set screw 28.

Referring again to FIGS. 1–5, the flexible tube portion 12 is nested in the rigid ring 14. The flexible tube portion 12 has an outer flexible cylindrical surface 30 whose circumference or undeformed diameter is smaller than the given circumference or diameter of the inside surface 18 of the rigid ring 14. The outer surface 30 of the flexible tube portion 12 is also free of gear teeth.

A wave generator 16 is arranged to push the outer surface 30 of the flexible tube portion 12 into frictional engagement against the inside surface 18 of the rigid ring 14, at two or more zones of contact along the inside surface 18. The wave generator 16 rotates the two or more zones of engagement about the inside surface 18 of the ring 14. The difference in circumferences between the outside surface 30 of the flexible tube portion 12 and the inside surface 18 of the ring 14 causes the flexible tube portion 12 to rotate a small amount relative to the rigid ring 14 upon each complete revolution of the wave generator 16, thus providing a large reduction ratio in a single stage.

Output torque of the drive 10 is limited by the coefficient of friction between the outside surface 30 of the flexible tube portion 12 and the inside surface of the rigid ring 14 and the contact force between them. Preferably the coefficient of friction for this example is from about 0.5 to about 0.8. Preferably the contact force for this example is from about 50 pounds to about 300 pounds. For other harmonic friction drives the coefficient of friction and contact force can be readily determined and depend on the torque which is desired from the drive 10.

In this preferred embodiment of the invention, the harmonic wave generator 16 forces the flexible tube portion 12 against the outer ring 14 at three points or contact zones 32. However, any desired number of contact zones can be used. It is conventional in harmonic gear drives to employ a wave generator of eliptical shape having two contact zones. A similar approach could be employed with this invention if only two contact zones 32 are desired.

Both fewer and more contact zones 32 are possible in accordance with this invention. Fewer than three contact zones 32 are possible, but a one contact zone 32 approach is difficult to implement and two contact zones 32 may not be sufficiently self-centering. More than three contact zones 32 are possible and may be useful for high torque, high ratio designs. Increasing the number of contact zones 32 requires increased distortion of the flexible tube portion 12. This could result in excessive fatigue for low ratio designs. The greater the number of contact zones 32 the greater the output torque generated by the drive 10. In the exemplary drive 10 shown in the figures there are three contact zones 32.

The input shaft 34 is connected by conventional means, such as for example a press fit at one of its ends (not shown), into a central hole 35 of the "Y" shaped yoke or support member 36 of the wave generator. The shaft 34 rotates the wave generator 16 to cause the contact points or zones 32 to rotate around the inner circumference 18 of the rigid ring 14. The outer circumference 30 of the flexible tube portion 12 of the cup 20 is intentionally less than the inner circumference 18 of the outer ring 14, so that as the contact zones 32 move around the inner circumferential surface 18 of the rigid ring 14 the flexible cup 20 must rotate a small amount to make up for the difference in the respective circumferences. The resulting speed reduction provided by the drive 10 is determined by the difference in the circumference of the outer surface 30 of the flexible tube portion 12 to the circumference of the inner surface 18 of the ring 14. Simplified, this becomes the ratio of the difference in the undeformed diameter of the outside surface 30 of the tube portion 12 to the inner diameter of the rigid ring 14.

Drive Ratio=(Rigid Ring *ID*–Flexible Cup *OD*)/ Rigid Ring *ID*

The torque limit of this drive is limited by the friction between the flexible portion 12 and the rigid ring 14 at each zone of contact.

Drive Torque=*N* Zones×(Radial *F*–Deform *F*) x Friction×*C*×*RRR*

Where: Drive Torque is the maximum torque of the wave generator 16. N Zones is the number of contact points or zones. Radial F is the force imposed by the wave generator assembly 16 at each zone. Deform F is the force required to deform the flexible tube surface 12. Friction C is the coefficient of friction between the respective surfaces 18 and 30. And RRR is the inner radius of the rigid ring 14.

In the embodiment shown, the wave drive 16 comprises a "Y" shaped frame or support member 36 attached to the input shaft 34. The support member 36 carries three roller bearing 37 support frames 38 and three springs 40 and set screws 42. Each of the bearing support frames 38 is hinged or pivotally mounted by bolts 39 passing through holes 41 at one of its ends 43 to an arm 44 of the support member 36. The support frames 38 can be forced outwardly to increase the radial extension of the bearing 37 against the inner surface 46 the tube portion 12. This is achieved by the action of a set screw 42 and spring 40 supported by an adjacent arm 44 of the support member 36 acting on the free end 48 of the support frame 38. This provides the radial contact force which presses the flexible tube portion 12 against the rigid ring 14.

The support frames 38 generally have an "L" shape with an inclined surface 50 extending between the long 52 and short 54 legs of the frame. Bolts 56 support bearings 37 for rotation on the support frames 38 and provide the path to apply the contact force to the flexible tube portion 12 with minimal losses.

In the embodiment shown the rigid ring 14 is held fixed and is bolted to drive 10 support plate 60. While a square plate 60 is shown it could have any desired shape. Referring to FIG. 5 the drive 10 may be supported within a housing 62 made up of two cup shaped halves 64 and 66 which are bolted to each other with the support plate 60 sandwiched therebetween. The exterior of the housing may have any desired shape, square as shown, or cylindrical, etc. While the ring 14 is held fixed in this embodiment it may if desired be rotatable and other elements of the drive 10 may be held fixed.

The bases 68 and 70 of the respective cup shaped housing halves 62 and 64 include centrally located tubular extensions 72 and 74 through which the respective shafts 24 and 34 extend outwardly of the housing 62. The shafts 24 and 34 are supported for rotation within the extensions 72 and 74 by respective bearings 76 and 78 and seals 80 and 82. The shafts 24 and 34 are connected by couplings 84 and 86 to input or output devices 88 or 90. The input device could be a motor or the output of some other device. The output device depends on the application for which the drive 10 is being used.

While the rigid ring 14 in the exemplary embodiment is held fixed and does not play an input or output role, if desired as will be described hereafter, it need not be fixed and it can be operative as an input or output device. For example, the outer surface of the ring could be cylindrical and it could operate as a roll for engaging a roll connected to an output or input device. The outer surface of the ring 12 could also support gear teeth, in which case it could act as a gear for engaging a gear connected to an output or input device. Any desired means for using the ring 12 as an input or output connection could be employed if desired.

A harmonic friction drive 10 may be configured to provide reduction gearing or it may function as a speed increaser or as a differential. For providing reduction the rigid ring 14 can be held fixed as shown, the wave generator 16 can provide the input and the flexible cup 20 can provide the output. The input shaft 34 and output shaft 24 would rotate in opposite directions. Alternatively, for reduction gearing the flexible cup 20 can be fixed, the wave generator 16 can be the input and the rigid ring 14 can be the output. The input shaft 34 and output shaft 24 would rotate in the same direction.

A harmonic friction drive can also operate to provide both reduction gearing and act as a differential. In this approach the wave generator 16 is fixed. The flexible cup 20 comprises the input and the rigid ring 14 comprises the output. The input shaft 34 and output shaft 24 would rotate in the same direction.

A wave generator can also be used to act as speed increaser gearing/differential. In this approach the wave generator 16 is fixed, the rigid ring 14 provides the input and the flexible cup 20 provides the output and the input and output move in the same direction.

A harmonic friction drive 10 may be used as a differential gearing. In this approach the wave generator 16 is the control input, the rigid ring 14 is the output and the flexible cup is the drive input. Various differential functions can be obtained by different combinations of speeds and rotations for the three elements 14, 16 and 20.

A harmonic friction drive 10 may also be operated as a speed increaser in two different modes. In a first mode the rigid ring is fixed, the flexible cup 20 comprises the input and the wave generator 16 comprises the output. The input shaft 24 and the output shaft 34 would rotate in opposite directions. By reversing the elements so that the flexible cup 20 is fixed and the rigid ring 14 is the input and with the wave generator 16 as the output, the input and output rotation would be in the same direction.

Accordingly it is apparent that harmonic friction drives or transmissions 10 are particularly useful ways of obtaining significant speed reduction or speed increase and can also be operated in a differential mode.

To provide the best frictional engagement between the surfaces 18 and 32 there respective surface roughnesses should average between about 20 microns and about 80 microns and preferably from about 30 microns to about 50 microns.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the spirit and scope of the appended claims.

What is claimed is:

1. A harmonic friction drive comprising: a rigid ring having a cylindrical inside surface of a given circumference, the inside surface being free of gear teeth, a member having a flexible tube portion, the flexible tube portion being nested in the rigid ring, the flexible tube portion having an outer surface whose circumference is smaller than the given circumference, the outer surface being free of gear teeth, a wave generator which pushes the outer surface of the flexible tube portion into frictional engagement against the inside surface of the ring at three zones of contact along the inside surface, and which rotates the three zones of contact about the inside surface of the ring in the form of a "Y" shaped member supporting rollers in a frame at each free end of each leg of the "Y" shaped member, whereby the difference in circumference between the outside surface of the ring causes of the flexible tube portion and the inside surface of the ring causes the flexible tube portion to rotate a small amount relative to the ring upon each complete revolution of the wave generator.

2. A harmonic friction drive as in claim 1 wherein said drive provides high ratio speed reduction in a single stage.

3. A harmonic friction drive as in claim 1 wherein each of said rollers is supported for movement outwardly from a central axis of said "Y" shaped member.

4. A harmonic friction drive as in claim 3 wherein for each of said rollers, a device is provided for applying a force to said roller to urge it outwardly, said force providing device being supported by the leg of said "Y" shaped member adjacent to the leg of said "Y" shaped member supporting the respective roller.

5. A harmonic friction drive as in claim 4 wherein each of said rollers is supported for rotation in said frame member pivotally mounted to each respective free end of each respective leg of said "Y" shaped member.

6. A harmonic friction drive as in claim 5 wherein the device for applying a force to said roller to urge it outwardly comprises a set screw for urging a spring member against said frame member.

* * * * *

UNITED STATES PATENT AND TRADEMARK OFFICE
CERTIFICATE OF CORRECTION

| | | |
|---|---|---|
| PATENT NO. | : 6,439,081 B1 | Page 1 of 1 |
| APPLICATION NO. | : 09/723689 | |
| DATED | : August 27, 2002 | |
| INVENTOR(S) | : David G Duff | |

It is certified that error appears in the above-identified patent and that said Letters Patent is hereby corrected as shown below:

Column 1, line 2, insert as a new paragraph:

This invention was made with Government support under MDA972-98-C-0009 awarded by DARPA. The Government has certain rights in this invention.

Signed and Sealed this

Eighteenth Day of March, 2008

JON W. DUDAS
*Director of the United States Patent and Trademark Office*